Oct. 1, 1957      J. E. FORD      2,807,905
FISHING LURE AND PLUG RETRIEVER
Filed Nov. 7, 1955
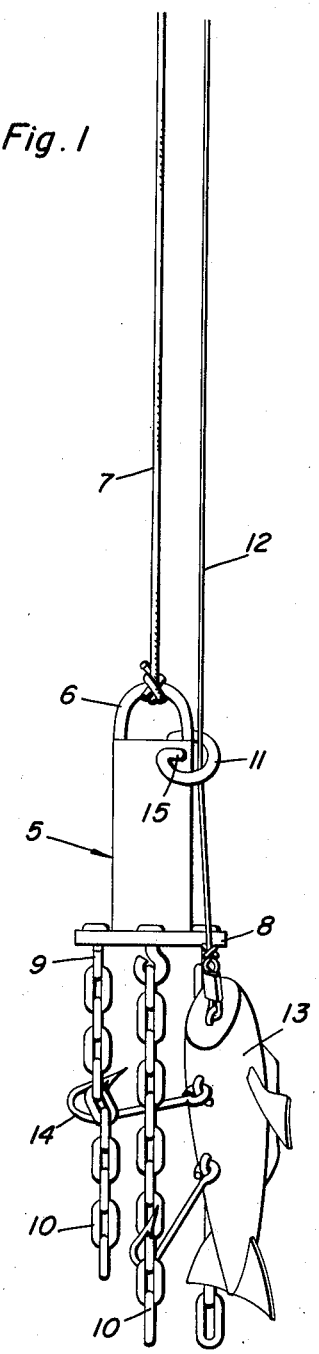
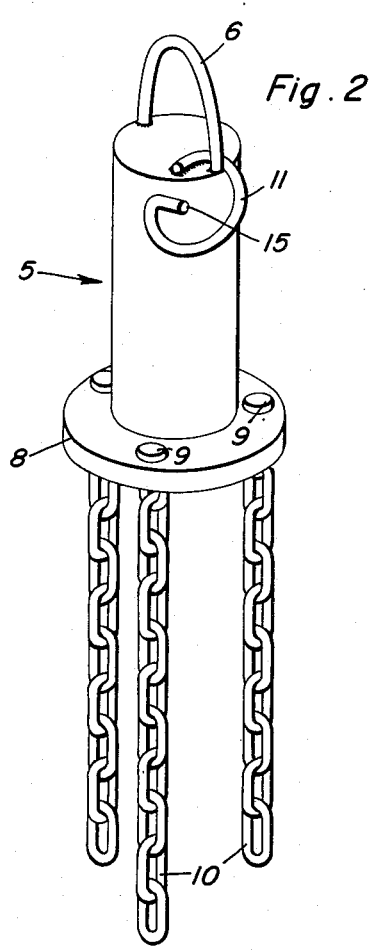
Jesse E. Ford
INVENTOR.

United States Patent Office 2,807,905
Patented Oct. 1, 1957

2,807,905

FISHING LURE AND PLUG RETRIEVER

Jesse E. Ford, Hereford, Tex.

Application November 7, 1955, Serial No. 545,229

1 Claim. (Cl. 43—17.2)

The present invention relates to new and useful improvements in fishing lure and plug retrievers and has for its primary object to provide, in a manner as hereinafter set forth, novel means for expeditiously disengaging such lures and plugs from submerged tree roots, rocks and other objects on which they become fouled in the water.

Another important object of the invention is to provide an artificial bait or lure and plug retriever of the aforementioned character comprising novel means for slidably and detachably connecting the device to the fishing line.

Other objects of the invention are to provide a retriever of the character described which will be comparatively simple in construction, durable, highly efficient and reliable in use and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an elevational view showing, in use, a retriever constructed in accordance with the present invention; and Figure 2 is a perspective view of the device.

Referring now to the drawing in detail, it will be seen that the embodiment of the invention which has been illustrated comprises a substantially cylindrical sinker 5 of suitable metal. Affixed to the upper end of the cylindrical sinker 5 is a metallic bail 6 for connecting a small operating rope or strand 7 to the device.

Formed integrally with the lower end portion of the sinker 5 is a flange 8. The flange 8 is apertured at spaced points and journaled in the apertures are swivels 9. Chains 10 of a suitable length are suspended from the swivels 9.

Also affixed to the upper end of the sinker 5 is a downwardly and spirally extending resilient loop or coil 11 of suitable metal. The coil or loop 11 constitutes a guide which slidably receives a fishing line, as indicated at 12. Reference character 13 designates a conventional lure on the line 12, said lure comprising the usual hooks 14. The guide 11 terminates at its free end in an inturned retaining hook 15 for the line 12, which hook abuts the periphery of the cylindrical sinker 5.

It is thought that the use or operation of the device will be readily apparent from a consideration of the foregoing. Briefly, to free or disengage a fouled lure, as at 13, the line 12 is slipped between the hook 15 and the sinker 5 into the resilient guide 11 for slidably mounting the device on said line. Through the medium of the rope 7 the device is then lowered on the line until it reaches the lure 13. Then, by raising and letting the device drop and repeating the operation as many times as may be necessary, the sinker 5 functions as a hammer or plunger to knock the lure loose from the object on which it may be fouled. Also, the chains 10 will become entangled in the hooks 14 for permitting said hooks to be disengaged from the object by pulling on the rope 7.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A fishing lure retriever of the character described comprising: a substantially cylindrical metallic sinker, a bail on one end of the sinker for connecting an operating line thereto, an apertured flange on the other end of said sinker, a plurality of swivels journaled in said flange, chains suspended from said swivels, and means for slidably connecting the sinker to a fishing line, said means including a resilient coil affixed to said one end of the sinker and extending spirally downward therefrom, said coil being for the reception of the fishing line, said coil terminating, at its free end, in an inturned reversely bent retaining hook for the fishing line yieldingly engaged with the periphery of the sinker and adapted for the insertion and removal of the fishing line therebetween.

References Cited in the file of this patent

UNITED STATES PATENTS

| | | |
|---|---|---|
| 978,519 | Vaughn | Dec. 13, 1919 |
| 2,482,037 | Swaim | Sept. 13, 1949 |
| 2,534,790 | Moore | Dec. 19, 1950 |
| 2,609,632 | Davis | Sept. 9, 1952 |
| 2,676,430 | Richard | Apr. 27, 1954 |
| 2,700,568 | Meili | Jan. 25, 1955 |
| 2,764,833 | Clark | Oct. 2, 1956 |